March 3, 1959 L. J. MATTINGLY 2,876,342

TELEVISION RECEIVER

Filed Oct. 14, 1953

INVENTOR.
Lawrence J. Mattingly
BY
Foorman L. Mueller
Atty.

United States Patent Office 2,876,342

Patented Mar. 3, 1959

2,876,342

TELEVISION RECEIVER

Lawrence J. Mattingly, Lombard, Ill., assignor to Motorola, Inc., Chicago, Ill., a corporation of Illinois Application October 14, 1953, Serial No. 385,979

3 Claims. (Cl. 250—20)

The present invention relates to television receivers and more particularly to an improved and simplified antenna coupling network for use in a television receiver.

It is usual in most present-day television receivers to provide a tuned inductance coil in the network coupling the television antenna to the radio frequency amplifier input stage of the receiver. This inductance coil is tuned in unison with other circuits of the receiver to the various signal channels in the television band, and this tuning is usually accomplished by a rotary switch successively contacting taps on the coil or by similar mechanisms.

In such television receivers, it is usually necessary to transform the balanced impedance of the television antenna to an unbalanced impedance that may be coupled to the radio frequency amplifier. This is achieved in the antenna coupling network of most present day television receivers by what is usually termed a "balun" transformer. The balun transformer, however, is relatively expensive and, in addition, requires a line to couple it to the antenna terminals of the receiver, which terminals are usually mounted on the back of the cabinet.

In accordance with the present invention, the balun transformer is replaced by a balanced-to-unbalanced impedance converting transmission line which couples the antenna input terminals to the tuned inductance coil in the antenna coupling network. This transmission line transforms the balanced impedance of the antenna to an unbalanced impedance and the latter impedance is matched by the inductance coil and associated impedance matching means to a desired impedance for optimum signal-to-noise ratio for the input of the radio frequency amplifier. Such a transmission line is relatively inexpensive and replaces not only the relatively expensive balun transformer, but also replaces the line previously required to couple the balun transformer to the antenna input terminals.

It is customary in a television receiver to obtain selectivity by the insertion of a bandpass filter network between the output of the radio frequency amplifier and the input of the first detector of the receiver. This network usually takes the form of a pair of tuned circuits inductively and capacitively coupled to one another. Such circuits require additional switch sections when switch tuning is used and also require a multiplicity of coils and capacitors. It is desirable, therefore, that the selectivity of the receiver be provided in the antenna coupling network rather than in the network coupling the radio frequency amplifier to the first detector. With the latter arrangement, a simple low quality factor (Q) coupling network can be used between the radio frequency amplifier and the first detector. When the transmission line of the present invention is used, it is infeasible to provide a high quality factor in the antenna coupling network since any slight changes in the physical position of the line changes its characteristics and if the line is unduly selective, such changes in its position might cause the receiver to be unresponsive to a desired signal channel.

It is, accordingly, an object of the present invention to provide in a television receiver an antenna coupling network that utilizes a transmission line for transforming the balanced antenna impedance to an unbalanced impedance, and which network has a relatively low quality factor but is constructed so that interfering signals are effectively trapped and prevented from entering the subsequent stages of the receiver.

A more general object of the invention is to provide in a television receiver a relatively simple and inexpensive antenna coupling network that operates efficiently and satisfactorily in a commercial television receiver.

When a transmission line is used in the antenna coupling network to transform the balanced antenna impedance to an unbalanced impedance, it has been found that the line has a tendency to resonate at frequencies corresponding to the frequencies of certain ones of the desired signal channels in the television band. These resonant points produce attenuation of such signal channels in the line and it is desirable that they be shifted to frequencies other than those of the desired signal channels. When this is achieved, the resonant points of the line, instead of being a detriment, can be used to attenuate unwanted interfering frequencies picked up by the receiver.

It is, accordingly, a further object of the invention to provide in a television receiver an improved antenna coupling network that includes a transmission line for transforming the balanced antenna impedance to an unbalanced impedance and which is constructed to resonate at frequencies other than those of the signal channels utilized by the receiver.

Television receivers have a tendency to receive interfering frequencies lying within the intermediate frequency band of the receiver. For example, the 40 to 46 megacycle signals in the present-day police band are often received by television receivers whose intermediate frequency corresponds to this band, and these signals constitute a troublesome interference problem.

It is, therefore, another object of the invention to provide an improved antenna coupling network that incorporates a transmission line for transforming the balanced impedance of the antenna to an unbalanced impedance and which is constructed to attenuate efficiently an interfering band of signals and prevent such signals from entering and being utilized by the receiver.

A feature of the invention is the provision in a television receiver of an improved antenna coupling network that includes a transmission line for transforming the balanced antenna impedance to an unbalanced impedance, the line being capacitively loaded at one end by a simple expedient to shift undesired resonant frequency points in the line away from the signal channels utilized by the receiver.

Another feature of the invention is the provision in a television receiver of an antenna coupling network including such a transmission line, which network is constructed to have a relatively low quality factor and which includes at least one simple and inexpensive resonant trap arranged to be selectively connected into the coupling network to prevent unwanted signals from being utilized by the receiver.

Yet another feature of the invention is the provision in a television receiver of an improved antenna coupling network including such a transmission line and which also includes a tuned inductance coil having a portion thereof shunted by a capacitor to constitute a resonant trap network for a particular signal channel when the receiver is tuned to another signal channel.

A further feature of the invention is the provision in a television receiver of an improved antenna coupling network including such a transmission line and which also includes a tuned inductance coil having a tap thereon to which an input terminal may be coupled to provide a simple coupling network for reception in a frequency band outside the normal frequency range of the receiver.

Yet another feature of the invention is the provision in a television receiver of an antenna coupling network that incorporates a transmission line for transforming the balanced antenna impedance to an unbalanced impedance, the line having a pair of spaced parellel inner conductors and a pair of spaced parallel outer conductors, and at least one of the pairs being intercoupled through a parall elresonant trap circuit which is tuned to an interfering frequency band to prevent interference by signals in such a band.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 1A, 2, 3:
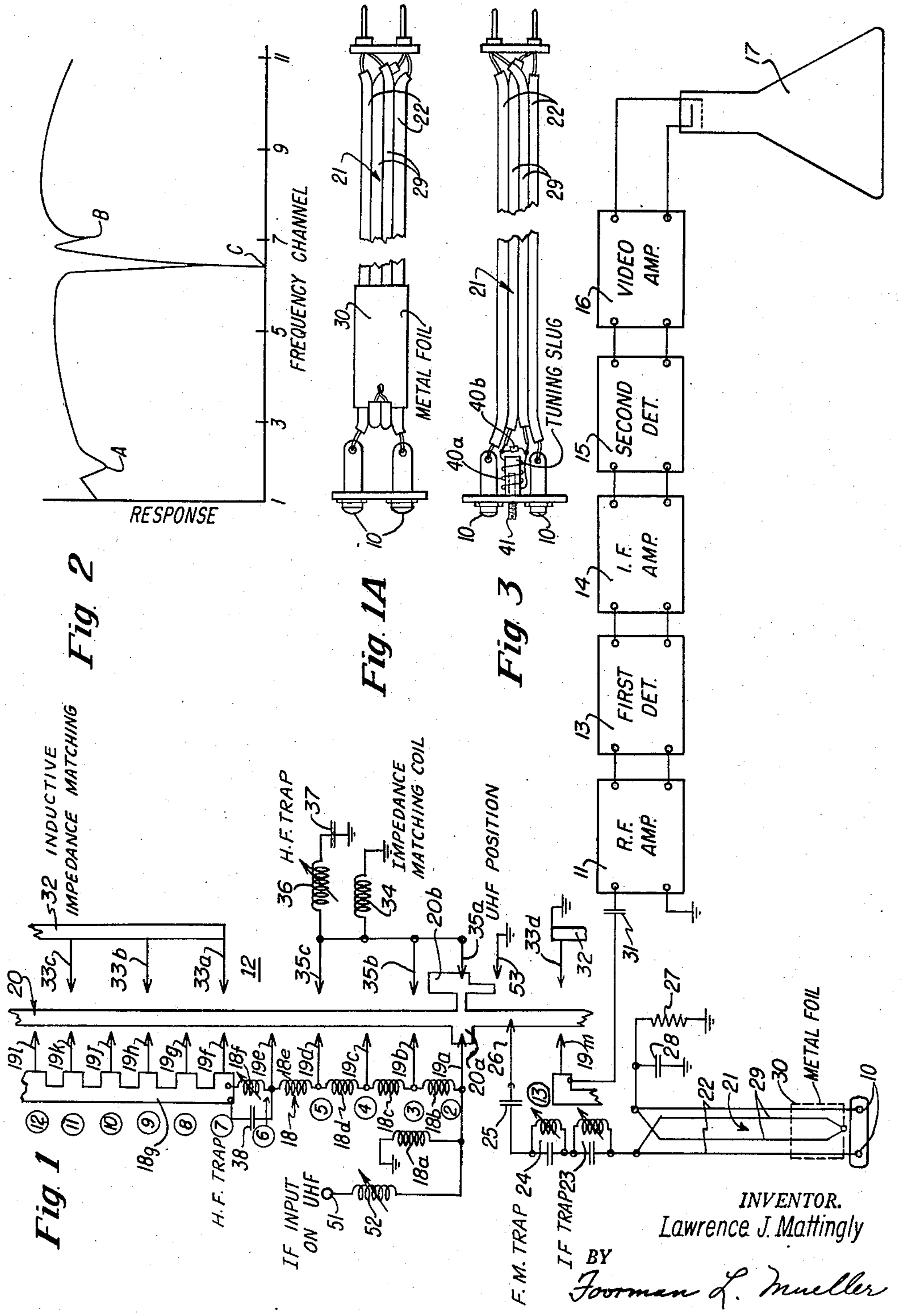
Figure 1 shows a television receiver incorporating the improved antenna coupling network of the invention.
Figure 1A illustrates a transmission line used in such coupling network.
Figure 2 is a curve showing the characteristics of an uncompensated transmission line in such an antenna coupling network.
Figure 3 shows a modified transmission line that may be used in the antenna coupling network referred to above.

The present invention provides an antenna coupling network for use in a television receiver and which is interposed between the antenna input terminals of the receiver and the receiver input stage. The antenna has a balanced impedance and the input stage of the receiver has an unbalanced input impedance. The coupling network comprises a tuned circuit tunable to a plurality of predetermined signal channels in a selected frequency band, and a transmission line for transforming the balanced antenna impedance to an unbalanced impedance and coupling the antenna input terminals to the tuned circuit, the transmission line resonating undesirably at at least one frequency corresponding to a certain one of the desired signal channels. Means is coupled to the transmission line for capacitively loading the line and thereby shifting the undesirable resonance of the line to a frequency other than those corresponding to the selected signal channels.

The invention also provides an improved antenna coupling network in a television receiver which comprises a tuned inductance coil with a series of taps thereon and switching contact means for successively contacting the taps. The switching contact means adjusts the resonant frequency of the tuned inductance coil to selected signal channels in a certain frequency band. A transmission line is provided that couples the antenna input terminals to successive taps on the tuned inductance coil by means of the switching contact means. The transmission line transforms the balanced impedance of the antenna to an unbalanced impedance and, in conjunction with the tuned inductance coil, provide an unbalanced impedance for optimum signal-to-noise ratio for the signal as applied to the input stage of the receiver. At least one resonant trap network is connected to the switching contact means, the trap being tuned to the frequency of a certain one of the selected signal channels and switched into circuit with the tuned inductance coil when the switching contact means adjusts the resonant frequency of the coil to a signal channel other than the signal channel to which the trap is tuned. In this manner, the dominant signal of a certain signal channel is prevented from entering the receiver circuit when the receiver is tuned to a different signal channel.

A television receiver of Figure 1 includes a pair of antenna input terminals 10 which, in accordance with well-known practice, are mounted on a suitable insulating strip which, in turn, is usually affixed to the rear wall of the receiver cabinet. The receiver also includes a radio frequency amplifier 11 which forms the input stage of the receiver, and an antenna coupling network designated generally as 12 intercouples the antenna input terminals 10 to the radio frequency amplifier 11.

The output terminals of amplifier 11 are coupled through a first detector 13 to an intermediate frequency amplifier 14. The intermediate frequency amplifier is coupled through a second detector 15 to a video amplifier 16 which, in turn, is coupled to the input electrodes of a cathode ray image reproducing device 17. The sound and scanning portions of the television receiver form no part of the present invention and for that reason have not been shown.

When the receiver is tuned to a selected television signal, such signal is impressed on radio frequency amplifier 11 through the antenna input terminals 10 and coupling network 12. The signal is amplified in amplifier 11 and heterodyned to the selected intermediate frequency of the receiver in first detector 13. The resulting intermediate frequency signal is amplified in intermediate frequency amplifier 14 and applied to second detector 15 wherein it is detected to produce a composite video signal. The composite video signal is amplified in video amplifier 16 and impressed on the input electrodes of reproducing device 17 to control the intensity of the cathode ray beam therein in well-known manner.

The antenna coupling network 12 includes an inductance coil 18 which in turn includes a series of inductive sections 18*a*–18*f* and an inductive bar 18*g*. The inductance coil 18 has a series of intermediate taps 19*a*–19*m* connected in the manner ilustrated between the various inductive sections and to successive points on the inductive bar, and these taps corresponding to desired signal channels (2–13) in the television frequency band. The inductance coil 18 and distributed capacity associated therewith form a resonant tuning network for the receiver. One end of inductance coil 18 is connected to ground and its other end is coupled through a capacitor 31 to radio frequency amplifier 11. The antenna coupling network also includes switching contact means 20 in the form, for example, of a rotary switch which successively contacts the taps 19*a*–19*m* by means of a protruding portion 20*a*.

The antenna coupling network 12 also includes a balanced-to-unbalanced impedance converting transmission line 21 illustrated in Fig. 1A, for coupling the balanced antenna connected to terminals 10 to the tuned inductance coil 18. Transmission line 21 includes a pair of spaced parallel outer conductors 22 connected at one end to the antenna input terminals 10. One of the outer conductors is coupled at its other end through a pair of resonant trap networks 23, 24 and through a coupling capacitor 25 to a terminal 26 in sliding contact with switch contact means 20, and the other end of the other outer conductor is coupled to a point of reference potential or ground through a resistor 27 shunted by capacitor 28. Capacitor 28 bypasses radio-frequency signals to ground to effect the transformation from the balanced antenna impedance to the desired unbalanced impedance. The resistor 27 serves to bleed off any charges that might collect on the antenna. Trap 23 is tuned to the intermediate frequency band of the receiver to present a high impedance to interfering signal frequencies within this band. Trap 24, on the other hand, is tuned to the present-day frequency modulation band whose low frequency end falls close enough to present-day television channel 6 to cause interference in the receiver, and in the latter trap presents a high impedance to the frequency-modulated signals in this band.

Transmission line 21 also includes a pair of spaced parallel inner conductors 29 which are also spaced and parallel to the outer conductors 22 and in the same plane therewith. Inner conductors 29 are connected together at the input terminal end of the line and are cross-connected to the outer conductors at the other end of the line. In this manner, line 21 consists of two transmission lines lying side by side each having, for example, a characteristic impedance of 150 ohms. Looking into line 21 from terminals 10, the two lines appear in series so that the input impedance is 300 ohms. Looking into line 21 from the other end, the two lines appear in parallel so that the output impedance is 75 ohms.

A metal foil 30 which, for example, may be composed of copper or other suitable material, is wrapped around the line at the antenna input terminal end thereof to provide a capacitive load for the line, the foil being connected to the junction of the inner conductors and capacitively coupled to the outer conductors.

An inductive impedance matching bar 32 is provided having one end connected to a point of reference potential or ground and having a series of intermediate taps **33*a*–33*d* which are successively contacted by a protruding portion 20*b* of switching contact means 20. In this manner, a variable impedance matching inductance is selectively connected between selected portions of the tuned inductance coil 18 and ground by the switch contact means 20, as will be described in more detail hereinafter. The antenna coupling network 12 also includes an impedance matching inductance coil 34 having one end connected to ground and the other end connected to a series of taps 35*a*–35*c* adapted to be contacted by the protruding portion 20*b* of switching contact means 20**.

A series-resonant trap network including inductance coil 36 and series capacitor 37 is shunted across inductance coil 34. A capacitor 38 is shunted across the inductive section **18*f* of inductance coil 18 between the taps 19*e* and 19*f*** to constitute with that inductive section a parallel resonant trap network.

A television signal intercepted by the antenna and supplied to the antenna input terminals 10 is translated to the tuned inductance coil 18 by the transmission line 21. Without the compensation of metal foil 30, the transmission line usually exhibits undesired resonant points at frequencies corresponding to signal channels that are to be utilized by the receiver. The response characteristic of the uncompensated transmission line is shown in Figure 2, and an examination of the curve of that figure reveals that a resonant point A occurs at a frequency corresponding to channel 2 (tap **19*a*) in the television frequency bond, and another resonant point B occurs at a frequency corresponding to channel 7 (tap 19*f*). A third resonant point C occurs between channel 6 (tap 19*e***) and channel 7 but has no adverse effect on the system since the frequency of this point is not utilized by the receiver.

To prevent undue attenuation of the signals of channels 2 and 7 by the transmission line, it is necessary to shift the resonant points A and B so that they fall between these signal channels rather than directly in the signal channels. These points could be shifted by extending the length of transmission line 21. However, it has been found that such an extension merely causes resonant point B at channel 7 to disappear but a resonant point to appear at channel 6. It has been found, however, that when the line is capacitively loaded, for example, by metal foil wrapped around the input terminal end of the line and connected to the inner conductors 21, that such loading effectively shifts the resonant points A and B so that they fall between the desired signal channels.

The antenna coupling network is constructed to have a low-quality factor (Q) for the reasons previously mentioned and, therefore, there is a tendency for signals in other channels to interfere with the signal in the particular channel to which the receiver is tuned. The usual interference to be encountered in present-day television receivers is from the higher to the lower channels. For example, when the receiver is tuned to channel 6, interference is encountered from the signals of channels 7 and 13; when the receiver is tuned to channel 5, interference from channel 11 occurs; and when the receiver is tuned to channel 4, there is a tendency for interference to occur from channel 8. These interfering frequencies are attenuated in accordance with the present invention by means including series resonant frequency trap circuit 36, 37. This trap circuit is connected into the coupling network when the receiver is tuned to the lower signal channels, for example, from channel 1 to channel 6, and bypasses the interfering frequencies to ground. In addition to the trap circuit 36, 37, the inductive portion **18*f* of inductance coil 18 is shunted by a capacitor 38 to provide a parallel resonant trap circuit between the higher and lower signal channels. Trap circuits 36, 37 and 18*f*, 38** operate together to provide an effective trapping means for the higher frequency signal channels when the receiver is tuned to the lower channels. The range of interfering frequencies from channels 7 to 13 is, by present-day standards, 182–214 megacycles, and the trapping means is tuned to attenuate this frequency band so that trapping of the interfering signals can be achieved for all the lower frequency signals.

The antenna impedance is transformed by line 21 from, for example, 300 ohms balanced to 75 ohms unbalanced, in the previously described manner. The resulting unbalanced impedance is then matched to the input impedance of the radio frequency amplifier for optimum signal-to-noise ratio. This involves stepping up the 75 ohm unbalanced impedance and is accomplished by coupling the antenna to a tap on tuned inductance coil 18 and by the impedance matching means discussed above, the matching means being selectively switched into the circuit by switch contact means 20. The antenna input terminal 26 is selectively connected to the taps **19*a*–19*m* on inductance coil 18 corresponding respectively to signal channels 2–13 in the television frequency band by adjustment of switch contact means 20. The desired impedance match for the inductance coil 18 is provided by inductance coil 34 for channels 2–6, and by selected portions of inductance bar 32 for channels 7–13. Coil 34 is the common matching impedance for all the low frequency channels (2–6). The impedance match for these channels is compromised by utilizing the known fact that over-coupling improves signal-to-noise ratio while reducing sensitivity only slightly. Therefore, over-coupling is provided for channel 6 by coil 34**, resulting in a slight loss in sensitivity and optimum coupling is still realized for channel 2.

Assume now that the switch contact means 20 is in the illustrated position with its protruding portion **20*a* contacting tap 19*a* corresponding to channel 2. The television signal of channel 2 is impressed on the terminal 26 through a capacitor 25 and through switch contact means 20 to tap 19*a* on tuned inductance coil 18**.

As stated above, there is a tendency for interfering images from the higher channels to be reproduced when the receiver is tuned to the lower channels. Therefore, when switch contact means 20 is in the illustrated position for channel 2, its protruding portion **20*b* contacts series resonant trap 36, 37 so that this trap, in conjunction with the trapping arrangement 18*f*, 38, attenuates these interfering signals. For channel 2, inductance coil 34 is connected across section 18*a* by tap 35*a* and portion 20*b* of switch contact means 20, and this coil assists in producing the desired impedance match for optimum signal-to-noise ratio for the input circuit or radio frequency amplifier 11**.

Similarly, when switch contact means 20 is shifted so that its protruding portion **20*a* contacts tap 19*b* and connects terminal 26 thereto, tuning the receiver to channel 3, the interfering higher frequency channels are still trapped by circuits 36, 37 and 18*f*, 38. Moreover, a desired impedance match is achieved by inductance coil 34** which is connected across sections 18a and 18b of tuned inductance coil 18 through tap 13b and protruding portion 20b of switch contact means 20. Likewise, the trapping circuits and the impedance matching inductance coil are connected in circuit with the tuned inductance coil 18 when the protruding portion 20a of switch contact means 20 is successively switched to contact taps 19c–19e, corresponding respectively to channels 4–6, so as to connect terminal 26 successively thereto.

When the portion 20a of the switch contact means 20 is adjusted to connect terminal 26 successively to taps 19f–19m, corresponding to channels 7–13, protruding portion 20b contacts successively taps 33a–33d which connect varying portions of the impedance matching inductive bar 32 across the various inductive sections of tuned inductance coil 18. This provides the desired impedance match for optimum signal-to-noise ratio when the receiver is tuned to these latter channels. It is to be noted that the trap circuits 36, 37, and 18f, 38 are no longer connected in circuit with inductance coil 18 when the switch contact means 20 is tuned from channel 7 to channel 13. This obtains because protruding portion 20b no longer contacts any of the terminals 35a–35c connected to trap circuit 36, 37; and protruding portion 20a of switch contact means 20 connects terminal 26 to the remote side of trap 18f, 38 and effectively short-circuits the portion of inductance coil 18 including this trap.

It is apparent that other traps may be connected in parallel with trap 36, 37 further to attenuate any interfering signals. However, it has been found that adequate trapping is provided by means of the trapping networks 36, 37 and 18f, 38 described previously herein.

The establishment of the ultra high frequency band for television signals has led to the requirement that television receivers be equipped with suitable apparatus, such as an ultra high frequency converter, to enable such receivers to utilize signals in the ultra high frequency band. The converter is tunable through the ultra high frequency band and usually heterodynes signals intercepted therein to the intermediate frequency of the television receiver. Such heterodyned signals are impressed on the television receiver and are amplified by the radio frequency amplifier and first detector and utilized by the receiver.

The antenna coupling network of the present invention includes a further input terminal 51 adapted to be connected to an ultra high frequency converter such as described above. Terminal 51 is coupled to the junction of inductive sections 18a and 18b through an inductance coil 52. A ground terminal 53 is provided, and when the contact switching means 20 is moved to a position where its protuberance 20a contacts terminal 26 and is out of contact with intermediate taps 19a–19m of inductance coil 18, protuberance 20b contacts ground terminal 53 so that line 21 is grounded and the antenna connected to terminals 10 is disabled.

In the latter position of the switch contact means 20, coil 52 and sections 18b–18g of inductance coil 18 are in series between input terminal 51 and radio frequency amplifier 11. Section 18a of inductance coil 18 connects the junction of coil 52 and the other sections of inductance coil 18 to ground to form a T equivalent transformer to match the output impedance of the ultra high frequency converter to the input impedance of radio frequency amplifier 11.

Coil 52 can be tuned to tune the antenna coupling circuit to the intermediate frequency and, in this manner, signals in the ultra high frequency band from the ultra high frequency converter are selected by the antenna coupling network and applied to radio frequency amplifier 11 with optimum signal-to-noise ratio for utilization by the receiver.

The invention provides, therefore, an improved and simplified antenna coupling network in which the relatively expensive balun transformer usually used in television receivers is replaced by a balanced-to-unbalanced impedance converting artificial transmission line which also replaces the line necessary to connect the balun transformer to the antenna input terminals. Moreover, even though the antenna coupling network is constructed to have a relatively low quality factor, the inclusion of a simple trapping arrangement renders it possible for the operation of the receiver to be not adversely affected thereby.

It has been found that under some circumstances, even with trap 23, interference occurs from signal frequencies lying within the intermediate frequency band of the receiver, for example, in the 40 to 46 megacycle band. Such interference can be prevented by modifying the transmission line 21 in the manner shown in Figure 3. In the modified form, the inner conductors 29 of line 21, instead of being connected together at the antenna terminal end of the line, are intercoupled through a parallel resonant trap network 40 which is tuned to the interfering frequency band. This trap effectively opens the inner conductors for frequencies within that band and renders the line inoperative to interfering signals of such frequencies. However, for other frequencies the line functions as if the inner conductors 29 were connected together in the manner shown in Figure 1. It has been found that the trap 40 provides sufficient capacitive loading for the line as to eliminate the need for the metal foil 30. The capacitive loading of the trap functions to shift resonant points A and B of Figure 2 to frequencies between the desired signal channels.

The invention portion of trap 40 may be made variable and a simple adjustment for the trap can be provided by threading a stud 41 coupled to the tuning core of the inductance portion through the antenna terminal plate. This provides a simple field adjustment for optimum performance of the transmission line.

The invention provides, therefore, a new and improved antenna coupling network for a television receiver that utilizes simple and inexpensive components and yet which functions efficiently and satisfactorily for all practical purposes in a commercial television receiver.

While particular embodiments of the invention have been shown and described, modifications may be made and it is intended in the appended claims to cover all such modifications as fall within the true spirit and scope of the invention.

I claim:

1. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, tuned inductance means tunable to a plurality of selected signal channels in a predetermined frequency band, a balanced-to-unbalanced impedance converting transmission line for coupling the input terminals to said inductance means and resonating undesirably at frequencies corresponding to at least some of the selected signal channels, said line having a pair of spaced parallel outer conductors connected at one end to the input terminals and coupled at the other end respectively to said inductance means and to a point of reference potential, said line also having a pair of spaced parallel inner conductors connected together at the input terminal end of said line and cross-connected to said outer conductors at the other end of said line, capacitive means connected to said inner conductors and capacitively coupled to said outer conductors at the input terminal end of said line for capacitively loading said line and thereby shifting the resonance of said line to frequencies different from any of the selected signal channels, and means for coupling said inductance means to the radio frequency amplifier and presenting an unbalanced impedance to said amplifier substantially matching the input impedance of said amplifier for optimum signal-to-noise ratio.

2. In a television receiver which comprises a pair of input terminals adapted to be coupled to an antenna having a balanced impedance and which also comprises a radio fraquency amplifier having an unbalanced input impedance, an antenna coupling network interposed between the input terminals and the amplifier including in combination, tuned inductance means tunable to a plurality of selected signal channels in a predetermined frequency band, a balanced-to-unbalanced impedance converting transmission line for coupling the input terminals to said inductance means and resonating undesirably at frequencies corresponding to at least some of the selected signal channels, said line having a pair of spaced parallel outer conductors connected at one end to the input terminals and coupled at the other end respectively to said inductance means and to a point of reference potential, said line also having a pair of spaced parallel inner conductors connected together at the input terminal end of said line and cross-connected to said outer conductors at the other end of said line, a metallic foil wrapped around said line at the input terminal end thereof, said foil being conductively connected to said inner conductors and capacitively coupled to said outer conductors for capacitively loading said line and thereby shifting the resonance of said line to frequencies different from the selected signal channels, and means for coupling said inductance means to the radio frequency amplifier and presenting an unbalanced impedance to said amplifier substantially matching the input impedance of said amplifier for optimum signal-to-noise ratio.

3. A television receiver which comprises a pair of input terminals adapted to be coupled to an antenna having a balanced impedance and which also comprises a radio frequency amplifier having an unbalanced input impedance, an antenna coupling network interposed between the input terminals and the amplifier including in combination, tuned inductance means tunable to a plurality of selected signal channels in a predetermined frequency band, a balanced-to-unbalanced impedance converting transmission line coupling the input terminals to said inductance means and resonating undesirably at frequencies corresponding to at least some of the selected signal channels, said line having a pair of spaced parallel outer conductors connected at one end to the input terminals and coupled at the other end respectively to said resonant circuit means and to a point of reference potential, said line also having a pair of spaced parallel inner conductors cross-connected to said outer conductors at said other end of said line, a parallel-resonant network tuned to a selected interfering frequency band coupling said inner conductors together at said input terminal end of said line and capacitively loading said line thereby to shift the undesired resonance of said line to frequencies different from the selected signal channels, and means for coupling said tuned inductance means to the radio frequency amplifier and presenting an unbalanced impedance to said amplifier substantially matching the input impedance of said amplifier for optimum signal-to-noise ratio.

References Cited in the file of this patent

UNITED STATES PATENTS

| | | |
|---|---|---|
| 2,137,266 | Case | Nov. 22, 1938 |
| 2,189,688 | Thomas | Feb. 6, 1940 |
| 2,615,983 | Bussard | Oct. 28, 1952 |
| 2,639,328 | Caraway | May 19, 1953 |
| 2,665,377 | Krepps | Jan. 5, 1954 |
| 2,715,211 | Murakami | Aug. 9, 1955 |
| 2,757,343 | Eland | July 31, 1956 |
| 2,806,945 | Wingert | Sept. 17, 1957 |

FOREIGN PATENTS

| | | |
|---|---|---|
| 277,799 | Great Britain | Sept. 29, 1927 |

OTHER REFERENCES

Popular Science, November 1952, pp. 180–181.